2 Sheets--Sheet 1.
A. L. BLACKMAN.
Improvement in Wheels for Vehicles.
No. 127,300. Patented May 28, 1872.
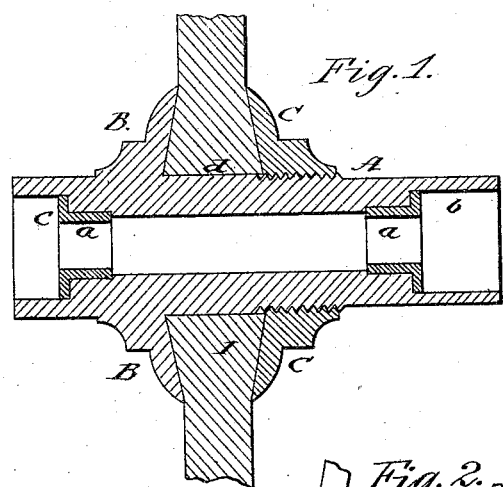
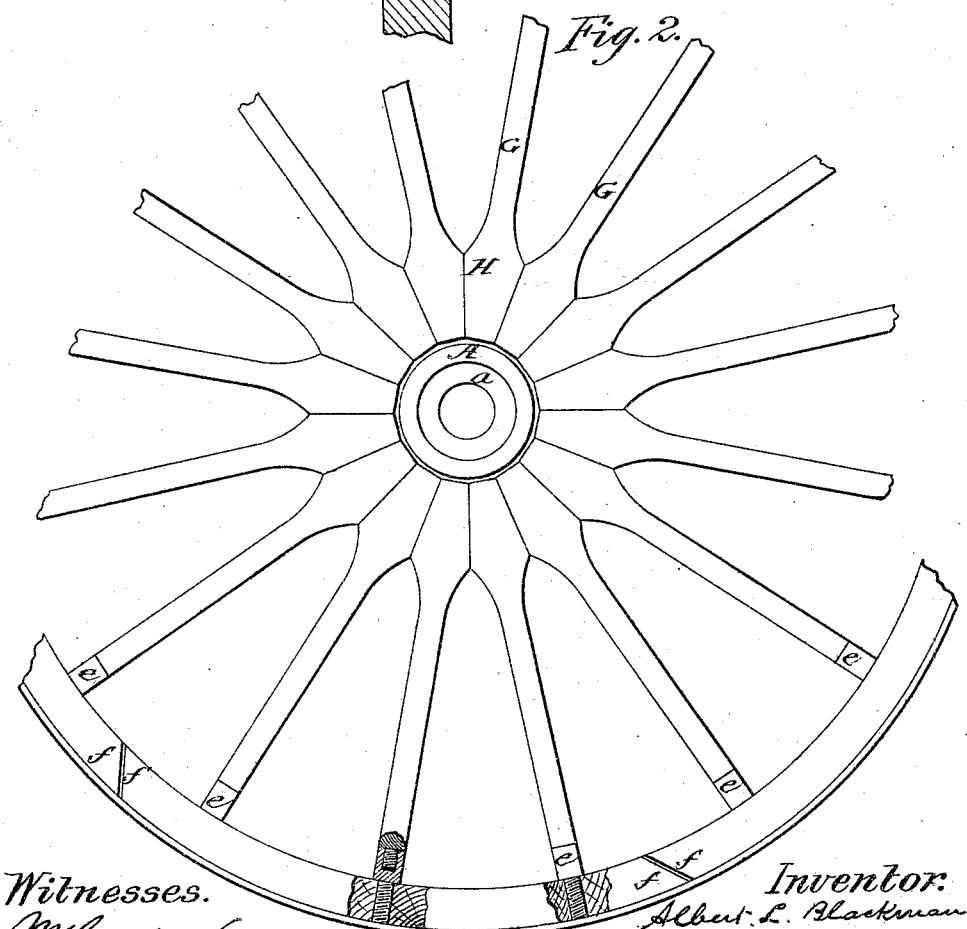
Witnesses.
Inventor:
Albert L. Blackman 2 Sheets--Sheet 2.
A. L. BLACKMAN.
Improvement in Wheels for Vehicles.
No. 127,300. Patented May 28, 1872.
Fig. 3.
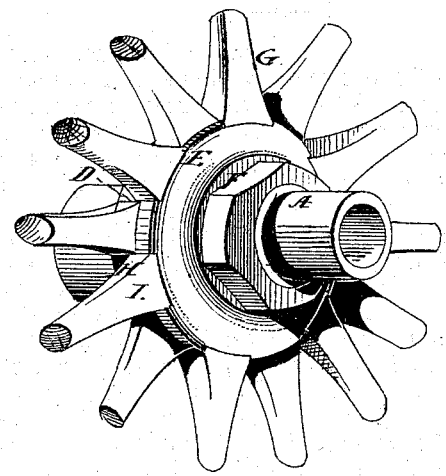
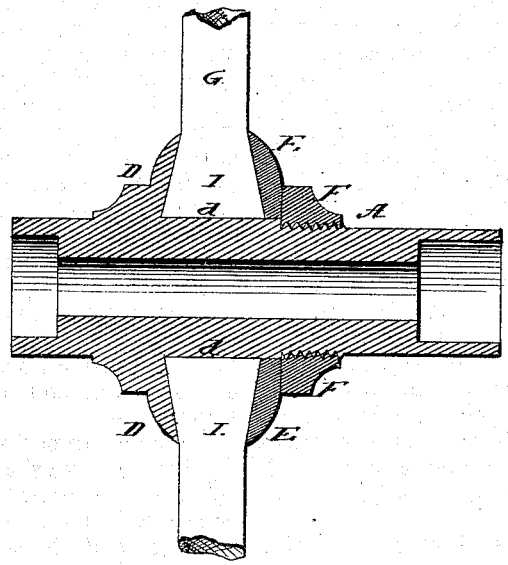
Fig. 4.
Attest:
M. Gardner
Edw. W. Down
Albert L. Blackman
By —— Atty
Inventor;

*Reissued Jan'y 28th 1873.*

127,300

UNITED STATES PATENT OFFICE.

ALBERT L. BLACKMAN, OF CROSS PLAINS, TENNESSEE.

IMPROVEMENT IN WHEELS FOR VEHICLES.

Specification forming part of Letters Patent No. 127,300, dated May 28, 1872.

*To whom it may concern:*

Be it known that I, ALBERT L. BLACKMAN, of Cross Plains, in the county of Robertson, State of Tennessee, have invented certain Improvements in Wheels for Wagons, Buggies, and other Vehicles; and I do hereby declare that the following is a full, clear, concise description of the same, reference being had to the accompanying drawing as forming a part of the specification.

My invention relates to certain improvements in the construction and arrangements of the component parts of the wheel, more fully described and pointed out hereafter.

The hub consists of a hollow cylinder or cast tube, A, having a circular concave-shaped clamp, disk, or flange, B, "cast with it," against which the spokes are held by an adjustable clamp, disk, or flange, C, that screws onto the cylinder. This hollow tube A may be made with a circular and alternating recess or mortise-clamp flange, D, "cast with it," in the recess of which the spokes G may be held, and with an adjustable, corresponding, alternating recess clamp-flange, E, to close on the other edge of the spokes to hold and keep them in place, and a flange-nut or confining-screw, F, to screw onto the tube A against flange E to govern its hold upon the spokes. Two chilled iron or steel tubes, $a$ $a'$, that may be screwed or otherwise fastened into the hub at $b$ and $c$, forming a bearing for the axle, may be used. These tubes, when worn out, can be replaced, thereby saving the hub from wear.

By the foregoing arrangements and construction of a hub several important points are gained—among which are, the wheel can be made light without impairing its strength; it can be made nearly if not quite straight without dish; the spokes can be taken out and replaced at will without injury to the hub or rim.

The spokes G are dressed at one end, H, trapezoidal or wedge-shaped one way, and are made to rest side by side against each other, in the space $d$, between the disks, each spoke abutting against its neighbor, forming a complete circle and one solid mass. The like ends of the spoke I are cut dovetailed, corresponding to the space between the flanges, giving to this end of the spoke a broad base, which, when resting on the face of the cast cylinder A, aids materially in overcoming any tendency toward a lateral movement; so that when the clamp-flange or disk C or E is screwed home the spokes are drawn tight together, filling the angles formed by the disks, and are hugged down close onto the hub-body, creating as it were a screw pressure that draws to the center from all directions, thereby preventing any motion whatever, or any tendency to dish the wheel. By the use of the alternating recessed clamps the wheel may be made, if necessary, perfectly straight.

On the extreme end of the spoke can be screwed a shouldered thimble-screw, $e$, that also screws into the felly and forms an adjustable tenon for the spokes. By this arrangement a spoke may be removed and replaced at will without injury to the hub or rim and without removing the tire, and it can be used as a means of tightening the tire without the necessity of cutting it. The fellies are jointed by oblique instead of square-shouldered joints $f$, which admits of tightening without cutting the tire, and gives additional strength and firmness to the wheel-rim.

With my combination and improvement in vehicle-wheels they can be made lighter, firmer, and more durable. The hub will be very durable. It can be refilled with spokes at will, and also with new bearings.

Having now described all that is essential to describe to have my invention known and fully understood, what I deem and esteem as my invention, and ask to protect by Letters Patent, is—

1. The combination of cast cylinder A, having the concave-shaped flange B, the adjustable concave flange C, in their respective forms or mechanical equivalents, and removable axle-bearings $a$ $a'$, the whole constructed and arranged substantially as and for the purposes set forth.

2. The combination of cast cylinder A, having the concave and recessed flange D, the adjustable concave recessed flange E, the flange-nut or confining-screw F, in their respective forms or mechanical equivalents, and the removable axle-bearings *a a'*, the whole constructed and arranged substantially as and for the purposes set forth.

3. The combination of the hub complete, "having either form of flange," spokes G in their trapezoidal or wedge-shape form H one way and dovetailed form I the other, thimble-screw tenon *e*, and the mitered or obliquely-cut and matched felly-joint *f*, the whole constructed and arranged substantially as described, and for the purposes set forth.

ALBERT L. BLACKMAN.

MILTON PITTS,
Q. Q. ARMSTRONG.